United States Patent [19]

Harry, Sr.

[11] Patent Number: 5,179,165

[45] Date of Patent: Jan. 12, 1993

[54] ETHYLENE/METHACRYLIC ACID COPOLYMERS IN POLY(PHENYLENE SULFIDE) COMPOSITIONS

[75] Inventor: Nathaniel Harry, Sr., Southfield, Mich.

[73] Assignee: International Flavors & Fragrances Inc., New York, N.Y.

[21] Appl. No.: 713,879

[22] Filed: Jun. 12, 1991

[51] Int. Cl.$^5$ .............................................. C08L 81/04
[52] U.S. Cl. ................................... 525/189; 525/537; 524/262; 524/432; 524/522; 524/609
[58] Field of Search ............... 524/262, 432, 609, 522; 525/189, 537

[56] References Cited

U.S. PATENT DOCUMENTS

| | | | |
|---|---|---|---|
| 3,884,873 | 5/1975 | Short | 260/45.85 B |
| 4,134,874 | 1/1979 | Needham | 260/37 SB |
| 4,176,098 | 11/1979 | Needham | 260/18 R |
| 4,247,598 | 1/1981 | Blackwell | 428/419 |
| 4,304,819 | 12/1981 | Blackwell | 428/419 |
| 4,365,037 | 12/1982 | Adachi et al. | 524/449 |
| 4,434,258 | 2/1984 | Schumacher et al. | 524/13 |
| 4,480,054 | 10/1984 | Enderle | 521/84.1 |
| 4,482,665 | 11/1984 | Dix | 524/262 |
| 4,489,129 | 12/1984 | Shue et al. | 428/366 |
| 4,504,551 | 3/1985 | Leland | 428/419 |
| 4,529,769 | 7/1985 | Johnson et al. | 524/425 |
| 4,540,538 | 9/1985 | Corwin et al. | 264/211 |
| 4,585,700 | 4/1986 | Johnson et al. | 428/419 |
| 4,659,761 | 4/1987 | Leland et al. | 524/262 |
| 4,680,326 | 7/1987 | Leland et al. | 524/262 |
| 4,740,425 | 4/1988 | Leland et al. | 428/447 |

OTHER PUBLICATIONS

A product guide published by E. I. Du Pont de Nemours and Company entitled *SURLYN® Ionomer Resins*.

A brochure entitled *IRGANOX®MD-1024: Extraction Resistant Antioxidant and Metal Deactivator*, published by Ciba-Geigy.

Article by J. D. Capolupo and T. M. Chucta entitled "Antioxidants" *Modern Plastics Encyclopedia 1988*, pp. 127-128.

*Primary Examiner*—Kriellion S. Morgan
*Assistant Examiner*—Tae H. Yoon
*Attorney, Agent, or Firm*—Arthur L. Liberman

[57] ABSTRACT

A composition suitable for encapsulating articles such as small electronic devices and having improved tensile strength and other mechanical properties. The composition comprises a poly(phenylene sulfide) base resin, a non-reinforcing mineral filler and an ethylene/methacrylic acid copolymer. Also provided are a method of forming the composition and articles such as electronic components encapsulated with the composition.

22 Claims, No Drawings

ETHYLENE/METHACRYLIC ACID COPOLYMERS IN POLY(PHENYLENE SULFIDE) COMPOSITIONS

BACKGROUND OF THE INVENTION

1. Field of the Invention

This invention relates in general to poly(phenylene sulfide) compositions, and more particularly, but not by way of limitation, to poly(phenylene sulfide) compositions suitable for encapsulating articles such as electronic components. This invention also relates to methods of forming poly(phenylene sulfide) compositions and articles formed of poly(phenylene sulfide) compositions.

2. Description of the Prior Art

Due to their excellent heat, chemical and electrical resistance, poly(phenylene sulfide) compositions are known to be useful for encapsulating articles such as electronic components. As encapsulating materials, poly(phenylene sulfide) compositions provide protection and electrical insulation.

The mechanical properties and electrical resistance of an encapsulating material are important. The material must be suitable for use in connection with encapsulation techniques that do not break or dislocate wires or other parts. In many applications, the electrical resistance of the encapsulating material must not be adversely affected by high temperature and/or high humidity. The encapsulating material must be able to withstand certain physical stresses, particularly stresses encountered during shipping, handling and assembling associated with the completed product.

When used in applications such as direct and indirect encapsulation of small electronic devices, it is critical for the rate of thermal expansion of the encapsulating material to be approximately the same as the rate of thermal expansion of the encapsulated component. A substantial difference between the rate of thermal expansion of the encapsulating material and the rate of thermal expansion of the encapsulated component can result in the formation of cracks in the encapsulating material and/or failure of the encapsulated component.

Although poly(phenylene sulfide) resins inherently have good mechanical properties and electrical resistance, their rate of thermal expansion is significantly different from the rate of thermal expansion of many components. In order to compensate for this difference, a non-reinforcing filler is typically admixed with the poly(phenylene sulfide) resin. The non-reinforcing filler makes the overall rate of thermal expansion of the encapsulating material approximately the same as the rate of thermal expansion of the encapsulated component. Unfortunately, the non-reinforcing filler also tends to lower the mechanical properties, particularly the tensile strength, of the encapsulating material. The reduction of mechanical properties makes it difficult to ship, handle and assemble the completed product and can adversely affect the product during use.

Although many additives are known to improve the tensile strength and mechanical properties of certain thermoplastic resins, there are no additives or additive systems that function to improve the tensile strength and other mechanical properties of all thermoplastic resins. The fact that a particular additive or additive system improves certain mechanical properties of one type of thermoplastic resin does not necessarily make it probable or even likely that the same additive or additive system will improve the same or additional physical properties of a different thermoplastic resin. Furthermore, even if a particular additive or additive system improves the tensile strength and other mechanical properties of the resin composition, it may render the composition unsuitable for use in encapsulating applications. For example, although reinforcing materials can be used to improve the tensile strength and other mechanical properties of poly(phenylene sulfide) compositions, they are not suitable for use in applications in which uniform thermal expansion is important. Unlike non-reinforcing fillers which expand uniformly in all directions, reinforcing fillers tend to have a low rate of thermal expansion in one direction and high rates of thermal expansion in the other directions. Nonuniform expansion of filler material can cause the encapsulating material to crack. Other additives or additive systems that may improve the mechanical properties of the resin often prevent use of the resin in certain encapsulation techniques.

SUMMARY OF THE INVENTION

By the present invention, it has been discovered that the addition of an ethylene/methacrylic acid copolymer to a polymer composition comprising a poly(phenylene sulfide) base resin and a non-reinforcing filler substantially improves the tensile strength and other mechanical properties of the composition.

In one aspect, the invention provides a polymer composition having improved mechanical properties upon being molded comprising a poly(phenylene sulfide) base resin, a non-reinforcing filler and an ethylene/methacrylic acid copolymer. In one embodiment, the composition comprises in the range of from about 10% to about 99.9% by weight of the base resin, in the range of from about 0.05% to about 70% by weight of the non-reinforcing filler, and in the range of from about 0.05% to about 40% by weight of the ethylene/methacrylic acid copolymer. The composition is very suitable for encapsulating articles such as small electronic components. The ethylene/methacrylic acid copolymer improves the mechanical properties of the composition without adversely affecting the rate or nature of the thermal expansion thereof.

In other aspects, the invention provides a method of producing the inventive composition, articles of manufacture formed of the inventive composition and articles such as electronic components encapsulated with the inventive composition.

It is, therefore, a principal object of the present invention to provide a poly(phenylene sulfide) composition that employs a non-reinforcing filler to control its average thermal expansion but yet has a sufficient tensile strength and other mechanical properties upon being used to encapsulate an article or otherwise molded.

It is an object of the present invention to provide a poly(phenylene sulfide) composition suitable for use to encapsulate articles such as small electronic components.

It is an object of the present invention to provide an improved method of forming a poly(phenylene sulfide) encapsulating composition and an improved encapsulation process.

It is a further object of the present invention to provide improved encapsulated articles such as encapsulated electronic components.

Other and further objects, features and advantages of the present invention will be readily apparent to those skilled in the art upon a reading of the following description of the preferred embodiments of the invention.

DETAILED DESCRIPTION OF THE PREFERRED EMBODIMENTS

In one aspect, the present invention provides a polymer composition having improved mechanical properties upon being molded. The composition is very suitable for encapsulating electronic components such as small electronic devices. In another aspect, the invention provides a method of producing the inventive polymer composition. In other aspects, the invention provides articles of manufacture formed of the inventive composition and articles such as electronic components encapsulated with the inventive composition.

The inventive polymer composition comprises a poly(phenylene sulfide) base resin, a non-reinforcing filler, and an ethylene/methacrylic acid copolymer.

The poly(phenylene sulfide) base resin is a poly(phenylene sulfide) resin having at least about 90% by weight of repeat units with the general formula I below:

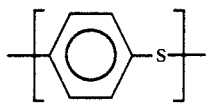

Poly(phenylene sulfide) resins particularly suitable for use as the base resin are those described in U.S. Pat. Nos. 3,354,129, 3,919,177 and 4,089,847, the disclosures of which are incorporated by reference herein.

The extrusion rate and viscosity of the poly(phenylene sulfide) base resin are important. The extrusion rate needs to be high enough and the viscosity low enough to allow for the use of an injection pressure during molding that is low enough to prevent damage to articles being encapsulated. The small nature of many electronic components renders the components susceptible to damage during the encapsulation process requiring the use of a low injection pressure. The extrusion rate of the base resin is preferably greater than about 150 g/10 min., more preferably in the range of from about 120 g/10 min. to about 180 g/10 min. As specified herein and in the appended claims, the extrusion rate of the base resin is determined by ASTM D1238-79, Procedure B -Automatically Timed Flow Rate Measurement, modified to use a 5 kg driving force, a 600 F. melt temperature and an orifice of 0.0825±0.0002 inches in diameter and 0.315±0.001 inch in length.

Preferably, the poly(phenylene sulfide) base resin is poly(phenylene sulfide) resin marketed by Phillips Chemical Company under the trademark RYTON® MR11. RYTON® MR11 has an extrusion rate of about 150 g/10 min.

As used herein and in the appended claims, a "non-reinforcing" filler means a filler that does not have significant reinforcing properties. Such a filler will generally have a very low aspect ratio (i.e., ratio of length to diameter). Preferably, the non-reinforcing filler employed in the inventive composition has an aspect ratio that is close to one. The non-reinforcing filler preferably has a particle size of smaller than 325 micrometers.

Preferably, the non-reinforcing filler is a mineral filler selected from the group consisting of kaolin, calcium carbonate and silica. More preferably, the non-reinforcing filler is silica. The silica can be amorphous silica or crystalline silica. Silica is commercially available as a finely ground material having a relatively narrow particle size distribution ranging from about 1 to about 100 micrometers. Such commercial silica is typically made up of about 99.5 weight percent $SiO_2$ with $Al_2O_3$, $Fe_2O_3$, $Na_2O$ and $K_2O$ as the remaining components. Most preferably, the non-reinforcing filler employed in the composition is fused silica. Particularly suitable fused silica is sold by Harbison-Walker Refractories, a division of Dresser Industries, Inc., under the trade designation "GP7I-SN5".

The non-reinforcing filler improves and maintains the dimensional stability, thermoconductivity and mechanical strength and improves the flexural modulus of the composition. The primary purpose of the filler is to compensate for the difference in the rate of thermal expansion of the poly(phenylene sulfide) base resin and the rate of thermal expansion of components encapsulated therewith. The filler makes the overall rate of thermal expansion of the encapsulating material approximately the same as the rate of thermal expansion of the encapsulated component. The filler serves to prevent or reduce the level of creep or deformation over time. Unfortunately, the filler reduces the mechanical properties, particularly the tensile strength, of the composition.

The ethylene/methacrylic acid copolymer functions to improve the tensile strength and other mechanical properties of the composition. Although the exact mechanism is unknown at this time, it is believed that the ethylene/methacrylic acid copolymer assists in coupling and/or compatibilizing the filler and base resin interface thereby improving the tensile strength and other mechanical properties. The copolymer also functions to decrease the flexural modulus of the composition. The amount of the ethylene/methacrylic acid copolymer employed in the inventive composition is very important. The flow rate of the composition is decreased to an unacceptable level if too much of the copolymer is employed. Particularly suitable ethylene/methacrylic acid copolymers are those sold by E.I. Du Pont de Nemours and Company under the tradename "SURLYN® Ionomer Resins". SURLYN® 9721 is most preferred due to its ability to be compounded.

The inventive composition preferably also comprises an organosilane. The organosilane improves the electrical resistance and hydrolytic stability of the composition. The organosilane provides for better adhesion at the interface between the base resin and the filler which in turn improves the resistance of the composition to moisture. Many suitable organosilanes are known in the art. Good results can be obtained with, for example, N-[2-[3-(trimethoxysilyl) propylamino]ethyl]-p-vinylbenzylammonium chloride. Organo-mercaptosilanes can also be used for this purpose. 3-mercaptopropyltrimethoxysilane, $HSCH_2CH_2CH_2Si(OCH_3)_3$, is preferred because of its high utility and improved electrical resistance and hydrolytic stability. Most preferably, the organosilane employed in the inventive composition is 3-mercaptopropyltrimethoxysilane sold by Union Carbide Corporation under the trade designation "A-189".

The composition preferably further comprises a colorant. Most preferably, the colorant employed is carbon black sold by Phillips Chemical Company under the trade designation "N110".

In addition, the composition preferably further comprises a small amount of zinc oxide. The use of zinc oxide in poly(phenylene sulfide) encapsulation compositions is described in U.S. Pat. No. 4,740,425, which is incorporated by reference herein. The zinc oxide stabilizes the composition and improves the reliability and lengthens the life of electronic components encapsulated therewith. The zinc oxide also inhibits color shift associated with the use of pigments and silanes in the composition. When zinc oxide is used in connection with an organosilane, the moisture resistance of the composition is synergistically improved. The exact mechanism of the synergistic improvement is unknown. A particularly suitable grade of zinc oxide is sold by Pacific Smelting Co. under the trade designation "#558".

A preferred composition of the present invention comprises a poly(phenylene sulfide) base resin having an extrusion rate in the range of from about 120 g/10 min. to about 180 g/10 min. (most preferably RYTON® MR11), a fused silica non-reinforcing filler (most preferably "GP 7I-SN5 by Harbison-Walker Refractories), an organosilane (most preferably "A-189" from Union Carbide Corp.), a colorant most preferably "N110" Carbon Black from Phillips Chemical Co.), zinc oxide (most preferably "#558" from Pacific Smelting Co.), and an ethylene/methacrylic acid copolymer (most preferably SURLYN® 9721 from E.I. Du Pont de Nemours and Company). An encapsulating composition comprising poly(phenylene sulfide) RYTON® MR11), a fused silica non-reinforcing filler ("GP 7I-SN5"), an organosilane ("A-189"), a colorant ("N110" Carbon Black) and zinc oxide ("#558") is sold by Phillips Chemical Company under the trade designation RYTON® BR06C. The addition of an ethylene/methacrylic acid copolymer to RYTON® BR06C provides for a higher safety margin and enhances the utility and effectiveness thereof. As shown by the Example included herewith, addition of an ethylene/methacrylic acid copolymer (SURLYN® 9721) to RYTON® BR06C improves the tensile strength of the composition by 48%. Thus, the inventive composition possesses all of the advantages of RYTON® BR06C (e.g., controlled thermal expansion) plus excellent tensile strength and other mechanical properties.

The amounts of the components to be employed in forming the inventive composition are preferably as follows:

| Amounts of Components | |
|---|---|
| (A) Poly(phenylene sulfide) | |
| Broad Range | about 10 to about 99.9 wt. % |
| Preferred Range | about 10 to about 60 wt. % |
| More Preferred Range | about 30 to about 35 wt. % |
| (B) Non-reinforcing Filler | |
| Broad Range | about 0.05 to about 70 wt. % |
| Preferred Range | about 10 to about 70 wt. % |
| More Preferred Range | about 55 to about 65 wt. % |
| (C) Ethylene/Methacrylic Acid Copolymer | |
| Broad Range | about 0.05 to about 40 wt. % |
| Preferred Range | about 1 to about 10 wt. % |
| More Preferred Range | about 1 to about 6 wt. % |
| (D)* Organosilane | |
| Broad Range | about 0.001 to about 5 wt. % |
| Preferred Range | about 0.5 to about 1.5 wt. % |
| (E)* Colorant | |
| Broad Range | about 0.001 to about 5 wt. % |
| Preferred Range | about 0.5 to about 1.5 wt. % |
| (F)* Zinc Oxide | |
| Broad Range | about 0.001 to about 10 wt. % |
| Preferred Range | about 0.5 to about 1.5 wt. % |

*Optional

The term "wt. %" is used herein and in the appended claims to mean the weight percent of the corresponding component based on the total weight of all the components forming the composition in which it is employed. The broad ranges listed above represent the ranges within which the composition should be confined in order to obtain satisfactory results. The preferred ranges are preferred because they define a composition possessing the physical, chemical and electrical properties best suited for its intended encapsulation purposes. As presently contemplated, the inventive composition optimally comprises 31.4% by weight of poly(phenylene sulfide) (RYTON® MR11), 62.6% by weight of a fused silica non-reinforcing filler ("GP 71-SN5"), 1.0% by weight of an organosilane ("A-189"), 1.0% by weight of a colorant ("N110" Carbon Black), 1.0% by weight zinc oxide ("#558"), and 3.0% by weight of an ethylene/methacrylic acid copolymer (SURLYN® 9721). The composition may optionally include small amounts of other ingredients such as, for example, pigments, flow improvers, and processing aids.

The composition of this invention can be prepared in accordance with any method wherein the poly(phenylene sulfide) base resin, non-reinforcing filler, ethylene/methacrylic acid copolymer and any other components are combined to form a mixture thereof. Preferably, the mixture is melt blended. Many suitable methods of preparing the composition are well known to those skilled in the art. For example, the components of the composition can be mixed together at room temperature in a rotating drum blender or in an intensive mixture such as a Henschel mixer to form a homogeneous mixture of the components. The homogeneous mixture can then be melt blended by heating the mixture to a temperature above the melting point of the poly(phenylene sulfide) base resin. A particularly suitable technique for melt blending the mixture is to pass the mixture through an extruder at a temperature above the melting point of the poly(phenylene sulfide) base resin. The extrudate can be pelletized or formed into strands, sheets or tapes whereby it can best be used for forming molded articles of manufacture, e.g., by injection molding and encapsulation techniques. Methods of producing the composition, articles of manufacture formed of the composition, articles of manufacture encapsulated with the composition and electronic components encapsulated with the composition are all embodiments of the invention.

The composition can be molded by various techniques known to those skilled in the art to form various articles of manufacture. The composition can be used to encapsulate electronic components in accordance with any encapsulation method suitable for thermoplastic encapsulation compositions. For example, the composition can be introduced into an injection molding apparatus to produce a melt which is extruded into an injection mold wherein the electronic component to be encapsulated is positioned. Transfer molding processes are also acceptable. The composition is particularly suitable for use to directly and indirectly encapsulate small electronic devices. Due to its flow rate, viscosity and other properties, the composition can be injected at a relatively low pressure which protects fragile components from damage.

The composition can be used to encapsulate, and the invention includes, both encapsulated active components (such as, for example, integrated circuits, transistors and diodes), and encapsulated passive components (such as, for example, capacitors, resistors and resistor networks). Examples of various electronic components that can be encapsulated with the composition and are part of the invention are disclosed in U.S. Pat. Nos. 4,482,665, 4,659,761, 4,740,425 and 4,504,551, the disclosures of which are incorporated in their entirety by reference herein. When used to encapsulate active electronic components, the composition should have a viscosity that is not greater than about 800 poise (as tested on a capillary rheometer at 650 F. and at a shear rate of 1000 (sec)$^{-1}$). Encapsulation of active electronic components with compositions having viscosity in excess of 800 poise can cause damage to the components. When used to encapsulate passive electronic components, the composition should have a viscosity not greater than about 1200 poise (as tested on a capillary rheometer at 650 F. and at a shear rate of 1000 (sec)$^{-1}$). Encapsulation of passive electronic components with compositions having viscosities in excess of about 1200 poise can cause damage to the components.

Thus, the present invention provides a polymer composition having improved mechanical properties that is very suitable for forming articles of manufacture and encapsulating articles such as small electronic components. The invention also provides a method of producing a composition having improved mechanical properties, articles of manufacture formed of the composition, articles of manufacture encapsulated with the composition as produced in accordance with the method and electronic components encapsulated with the composition. The composition is suitable for use in encapsulation techniques that do not dislocate or break wires and/or parts or otherwise damage the component being encapsulated. The composition has excellent electrical resistance and mechanical properties. Although the composition employs non-reinforcing fillers to make its overall rate of expansion approximately equal to the rate of expansion of the encapsulated component, it has excellent tensile strength and other mechanical properties. As a result, completed products are not easily damaged during shipping, handling, assembling, etc. associated therewith.

The following example is presented to further illustrate the compositions and methods of the invention. The particular species and conditions employed in the examples are intended to be illustrative of the invention and not limiting thereto.

EXAMPLE

A series of tests were carried out to determine certain mechanical properties of the inventive composition. Two samples of the inventive composition were tested. The relative amounts of the non-reinforcing filler and ethylene/methacrylic acid copolymer were varied in each test. A sample of an encapsulating composition consisting of the same components as the samples of the inventive composition except for the ethylene/methacrylic acid copolymer was also tested. All of the samples tested are shown below in Table I.

TABLE I

| | Sample Compositions | | |
|---|---|---|---|
| Components | Inventive Composition A (Wt. %[1]) | Inventive Composition B (Wt. %[1]) | Control Composition (Wt. %[1]) |
| PPS[2] | 31.4 | 31.4 | 34.4 |
| Silica[3] | 62.6 | 59.6 | 62.6 |
| Organosilane[4] | 1.0 | 1.0 | 1.0 |
| Zinc Oxide[5] | 1.0 | 1.0 | 1.0 |
| Colorant[6] | 1.0 | 1.0 | 1.0 |
| Eth./methacryl. Acid copol.[7] | 3.0 | 6.0 | |
| Total | 100.0 | 100.0 | 100.0 |

[1]Percent by weight of the component based on the total weight of all components forming the composition.
[2]Poly(phenylene sulfide) sold by Phillips Chemical Company under the trademark RYTON ® MR11.
[3]Fused silica sold by Harbison-Walker Refractories, a division of Dresser Industries, Inc., under the trade designation "GP 71-SN5".
[4]3-mercaptopropyltrimethoxysilane sold by Union Carbide Corp. under the trade designation "A-189".
[5]Sold by Pacific Smelting Co. under the trade designation "#558".
[6]Carbon black sold by Phillips Chemical Company under the trade designation "N110".
[7]Ethylene/methacrylic acid copolymer sold by E. I. Du Pont de Nemours and Company under the trademark SURLYN ® 9721.

Each sample was prepared by blending the components in a Henschel intensive mixer for approximately three minutes, and passing the resulting mixture through a single screw Crown extruder at 590–630 F. and pelletizing the same. The pelletized samples were then formed into small bars (5 in. long, ½ in. wide, ⅛ in. thick) by conventional injection molding techniques (i.e., using an Arburg Model 220E/150 injection molding machine operating at a 625±10° F. barrel temperature, 5 in./sec. injection speed and 10,000±2,000 psi injection and holding pressure).

The tensile strength (unannealed and annealed), flexural modulus, flexural strength, impact strength (unnotched Izod and notched Izod), ash content, insulation resistance, and dielectric strength of the samples were then determined.

The unannealed and annealed tensile strengths of each sample were determined in accordance with ASTM D638. The flexural modulus and flexural strength of each sample were determined in accordance with ASTM D790. The unnotched Izod and notched Izod impact strengths of each sample were determined in accordance with ASTM D256. The ash content of each sample was determined by heating a weighed portion of the sample in a muffle furnace for 75 minutes at 1500 F., determining the weight of the ash that remained after the 75 minutes and dividing the weight of the remaining ash by the initial weight of the sample portion being tested. The insulation resistance of each sample was determined in accordance with ASTM D257-78 using an exposure time of 48 hours, a temperature of 90° C. and a relative humidity of 95%. The dielectric strength of the test specimens was determined in accordance with ASTM D149-75.

The results of the tests are shown in Table II below.

TABLE II

| | Mechanical Properties | | | | | | | |
|---|---|---|---|---|---|---|---|---|
| | Tensile Strength | | Flexural Modulus (psi) | Flexural Strength (psi) | Impact Strength | | Ash (%) | Ins. Res. (ohms) | Diel. Str. (volts) |
| Sample | Unann. (psi) | Ann. (psi) | | | Unn. Izod (Ft.-lbs./in.) | Not. Izod (Ft.-lbs./in.) | | | |
| Inventive Composition A | 4200 | 5350 | 1,804,500 | 7300 | 0.56 | 0.38 | 64.2 | 6 × 10$^{13}$ | 446 |
| Inventive Composition B | 4150 | 5375 | 967,350 | 6800 | 0.75 | 0.32 | 58.3 | 2 × 10$^{14}$ | 330 |
| Control Composition | 3850 | 3600 | 2,035,200 | 8600 | 0.59 | 0.36 | 64.0 | >2 × 10$^{14}$ | 494 |

The results of the tests show that the addition of an ethylene/methacrylic acid copolymer to an encapsulating composition comprising poly(phenylene sulfide) and a non-reinforcing filler significantly improves the tensile strength and other mechanical properties thereof. For example, the annealed tensile strength of the composition comprising 3.0% by weight of the ethylene/methacrylic acid copolymer was 48.6% higher than the annealed tensile strength of the control sample. The annealed tensile strength of the inventive composition comprising 6.0% of the ethylene/methacrylic acid copolymer was 49.3% higher than the annealed tensile strength of the control composition.

Thus, the present invention is well adapted to carry out the objects and attain the ends and advantages mentioned as well as those inherent therein. While numerous changes in components, quantities and the like may be made by those skilled in the art, such changes are encompassed within the spirit of this invention as defined by the appended claims.

I claim:

1. A poly(phenylene sulfide) polymer composition having improved mechanical properties upon being molded comprising:
   in the range of from about 10% to about 60% by weight of a poly(phenylene sulfide) base resin;
   in the range of from about 10% to about 70% by weight of a non-reinforcing filler for controlling the overall rate of thermal expansion of said composition; and in the range of from about 1% to about 10% by weight of an ethylene/methacrylic acid copolymer for improving mechanical properties of said composition.

2. The polymer composition of claim 1 wherein said composition comprises in the range of from about 30% to about 35% by weight of said poly(phenylene sulfide) base resin, in the range of from about 55% to about 65% by weight of said non-reinforcing filler and in the range of from about 1% to about 6% by weight of said ethylene/methacrylic acid copolymer.

3. The polymer composition of claim 1 wherein said poly(phenylene sulfide) base resin has an extrusion rate in the range of from about 120 g/10 min. to about 180 g/10 min.

4. The polymer composition of claim 1 wherein said non-reinforcing filler is a mineral filler selected from the group consisting of kaolin, calcium carbonate and silica.

5. The polymer composition of claim 1 wherein said non-reinforcing filler is silica.

6. The polymer composition of claim 1 further comprising an organosilane present in said composition in an amount in the range of from about 0.001% to about 5% by weight based on the weight of said composition.

7. The polymer composition of claim 1 further comprising zinc oxide present in said composition in an amount in the range of from about 0.001% to about 10% by weight based on the weight of said composition.

8. An article of manufacture encapsulated with the polymer composition of claim 1.

9. A poly(phenylene sulfide) polymer composition for encapsulating an electronic component having improved mechanical properties upon being molded comprising:
   in the range of from about 10% to about 60% by weight of a poly(phenylene sulfide) base resin having an extrusion rate in the range of from about 120 g/10 min. to about 180 g/10 min.;
   in the range of from about 10% to about 70% by weight of a non-reinforcing mineral filler for compensating in a difference in the rate of thermal expansion of said poly(phenylene sulfide) base resin and the rate of thermal expansion of said electronic component; and
   in the range of from about 1% to about 10% by weight of an ethylene/methacrylic acid copolymer for improving mechanical properties of said composition.

10. The polymer composition of claim 9 wherein said composition comprises in the range of from about 30% to about 35% by weight of said poly(phenylene sulfide) base resin, in the range of from about 55% to about 65% by weight of said non-reinforcing mineral filler and in the range of from about 1% to about 6% by weight of said ethylene/methacrylic acid copolymer.

11. The polymer composition of claim 9 wherein said non-reinforcing mineral filler is selected from the group consisting of kaolin, calcium carbonate and silica.

12. The polymer composition of claim 9 wherein said non-reinforcing mineral filler is fused silica.

13. The polymer composition of claim 9 further comprising in the range of from about 0.001% to about 5% by weight of an organosilane.

14. The polymer composition of claim 9 further comprising in the range of from about 0.001% to about 10% by weight of zinc oxide.

15. The polymer composition of claim 9 further comprising in the range of from about 0.001% to about 5% by weight of a colorant.

16. An electronic component encapsulated with a poly(phenylene sulfide) polymer composition having improved mechanical properties, said composition comprising:

in the range of from about 10% to about 60% by weight of a poly(phenylene sulfide) base resin having an extrusion rate in the range of from about 120 g/10 min. to about 180 g/10 min.;

in the range of from about 10% to about 70% by weight of a non-reinforcing filler for compensating for a difference in the rate of thermal expansion of said poly(phenylene sulfide) base resin and the rate of thermal expansion of said article; and in the range of from about 1% to about 10% by weight of an ethylene/methacrylic acid copolymer for improving mechanical properties of said composition.

17. The polymer composition of claim 16 wherein said composition comprises in the range of from about 30% to about 35% by weight of said poly(phenylene sulfide) base resin, in the range of from about 55% to about 65% by weight of said non-reinforcing filler and in the range of from about 1% to about 6% by weight of said ethylene/methacrylic acid copolymer.

18. The electronic component of claim 16 wherein said non-reinforcing filler of said composition is a mineral filler selected from the group consisting of kaolin, calcium carbonate and silica.

19. The electronic component of claim 16 wherein said non-reinforcing filler of said composition is silica.

20. The electronic component of claim 16 wherein said composition further comprises in the range of from about 0.001% to about 5% by weight of an organosilane.

21. The electronic component of claim 16 wherein said composition further comprises in the range of from about 0.001% to about 10% by weight of zinc oxide.

22. The electronic component of claim 16 wherein said composition further comprises in the range of from about 0.001% to about 5% by weight of a colorant.

* * * * *

UNITED STATES PATENT AND TRADEMARK OFFICE
CERTIFICATE OF CORRECTION

PATENT NO. : 5,179,165
DATED : January 12, 1993
INVENTOR(S) : Nathaniel Harry, Sr.

It is certified that error appears in the above-indentified patent and that said Letters Patent is hereby corrected as shown below:

On the title page under the heading "[73] Assignee:" delete "International Flavors and Fragrances Inc., New York, N.Y." and insert --Phillips Petroleum Company, Bartlesville, Oklahoma--; and On the title page under the heading "Attorney, Agent, or Firm", delete "Arthur L. Liberman" and insert --LANEY, DOUGHERTY, HESSIN & BEAVERS--.

Signed and Sealed this

Sixteenth Day of November, 1993

Attest:

BRUCE LEHMAN

*Attesting Officer*     *Commissioner of Patents and Trademarks*